US005786587A

United States Patent [19]

Colgate, Jr.

[11] Patent Number: 5,786,587
[45] Date of Patent: Jul. 28, 1998

[54] ENHANCEMENT OF CHIP CARD SECURITY

[75] Inventor: Gilbert Colgate, Jr., New York, N.Y.

[73] Assignee: American Bank Note Holographics, Inc., Elmsford, N.Y.

[21] Appl. No.: 689,089

[22] Filed: Aug. 5, 1996

Related U.S. Application Data

[60] Provisional application No. 60/002,120 Aug. 10, 1995.

[51] Int. Cl.⁶ .................................................. G06K 19/00
[52] U.S. Cl. .................................................. 235/487; 235/454
[58] Field of Search .................................. 235/382, 487, 235/454

[56] References Cited

U.S. PATENT DOCUMENTS

| | | |
|---|---|---|
| 4,001,550 | 1/1977 | Schatz . |
| 4,013,894 | 3/1977 | Foote et al. . |
| 4,034,211 | 7/1977 | Horst et al. . |
| 4,105,156 | 8/1978 | Dethloff . |
| 4,150,781 | 4/1979 | Silverman et al. ............... 235/382 |
| 4,382,279 | 5/1983 | Ugon . |
| 4,614,861 | 9/1986 | Pavlov et al. . |
| 4,630,201 | 12/1986 | White . |
| 4,684,795 | 8/1987 | Colgate, Jr. . |
| 4,788,420 | 11/1988 | Chang et al. . |
| 5,151,582 | 9/1992 | Fujioka . |
| 5,336,871 | 8/1994 | Colgate, Jr. . |
| 5,432,329 | 7/1995 | O'Boyle et al. . |

OTHER PUBLICATIONS

The Nelson Report, No. 254 (Feb. 1981), pp. 1, 3, 6.

*Primary Examiner*—Harold Pitts
*Attorney, Agent, or Firm*—Cooper & Dunham LLP

[57] ABSTRACT

A chip card, such as a financial transaction card, having first identifying data written in a read-only memory portion of circuitry contained in the card, wherein second and third identifying data are respectively coded in a machine readable optically variable device (e.g., a hologram) and a magnetic stripe on the card. The authenticity of the card is verified by combining these different identifying data; for example, the second and third identifying data may be combined to produce an algorithm which is compared with the first identifying data for authentication of the card.

13 Claims, 2 Drawing Sheets

ENHANCEMENT OF CHIP CARD SECURITY

CROSS-REFERENCE TO RELATED APPLICATIONS

This application is a continuation of U.S. provisional patent application Ser. No. 60/002,120, filed Aug. 10, 1995.

BACKGROUND OF THE INVENTION

This invention relates to the provision of enhanced security for so-called chip cards, sometimes also referred to as "smart cards."

A chip card is a credit-card-sized object (e.g., about 2⅛ inches wide, 3⅜ inches long, and 30 mils thick) made of a plastic such as polyvinyl chloride and incorporating an integrated circuit (chip) as a microprocessor. The integrated circuit or chip includes a changeable (rewritable) memory, and is arranged to be energized by an external power supply and to exchange data (input/output) with an external terminal when the card is inserted in the terminal. Such cards are currently used, or proposed to be used, for diverse tasks such as access, identification, and the performance of financial transactions. One illustrative type of chip card, to which however the present invention is not limited, is described in U.S. Pat. No. 4,105,156, the disclosure of which is incorporated herein by this reference.

By way of example, a chip card may be designed and used for financial transactions such as obtaining cash from off-line automatic teller machines (ATMs), i.e., terminals not connected to a central computer that stores the cardholder's account information. For example, value (an amount of money) can be stored on a chip card by a cardholder at a terminal connected to the central computer of the cardholder's bank; the amount thus stored is debited from the cardholder's account by the central computer. At an off-line ATM, the cardholder can then obtain cash up to the amount stored on the card by keying in the sum to be withdrawn, and the off-line ATM will rewrite, onto the rewritable memory of the chip card, the amount (if any) remaining on the card. The chip may also record the transaction.

It is known to provide a conventional credit card, access card or identification card with a magnetic stripe for security purposes, and to provide such a card with a hologram as a security device, i.e. to hinder counterfeiters, since holograms are difficult to copy successfully. In addition, it is known to combine a hologram with a magnetic stripe as a security device for credit cards, as described in U.S. Pat. No. 4,684,795, the disclosure of which is incorporated herein by this reference. Such a combined holographic/magnetic stripe with different data sets respectively encoded in the hologram and the magnetic stripe, for authentication by a reading device having both optical and magnetic heads, is described in U.S. Pat. No. 5,336,871, the disclosure of which is incorporated herein by this reference. A particular arrangement for encoding such optical data in a hologram is described in U.S. Pat. No. 5,432,329, the disclosure of which is also incorporated herein by this reference.

In the case of present-day chip cards, however, security is provided by computer-directed cryptography, together with certain built-in physical features such as fuses that are designed to make the chip difficult to assault. The chip includes a write once/read only memory (e.g. an EPROM) as well as the changeable or rewritable memory. A security code, such as a personal identification number (PIN), is written to the EPROM memory. The PIN may be encrypted in the chip; the integrated circuit may be so designed that the stored PIN in its read-only memory is externally inaccessible by ordinary means. When the card is inserted in a terminal such as an ATM, the cardholder keys the PIN into the terminal; either the terminal or the chip compares the keyed and stored numbers and authenticates the card upon determining that the two numbers are identical. If, however, the cardholder is unable to supply the correct PIN within a certain limited number of attempts, the terminal may disable the card with an electrical pulse that acts on one or more fuses interconnecting elements of the chip circuitry.

Chip cards are nevertheless potentially vulnerable to various types of attack, both physical and cryptographic. They are quite friable, and easily damaged by thieves. The chip manufacturer may be subverted so that additional chips appear on the market, identical to genuine chips used in cards, and a criminal with the intelligence and information to utilize them may undertake to mimic the features which the genuine users put into the chip to protect them. It is to be expected that concerted, and ultimately successful, attempts will be made to break the codes or compromise the encryption protecting chip cards, especially those in which significant information or wealth is stored. Also, it may be possible to make extra chips and load them with money.

The aforementioned U.S. Pat. No. 4,105,156 describes a chip card security method in which a unique random number is written to a read-only memory (ROM) at the point of manufacture and used, in conjunction with another number, as an identification number. This security arrangement could be defeated, without manipulating the cryptography of the original chip, by substituting a new but similar chip for the original chip. Such a possibility is available to the counterfeiter having a supply of similar blank chips which could be written with the discoverable unique random number, thereby duplicating exactly the chip to be counterfeited.

It would be desirable, from the standpoint of enhanced security, to provide a chip card in which the chip cannot be removed from one card and inserted in another card or replaced with another chip.

SUMMARY OF THE INVENTION

The present invention, in a first aspect, broadly contemplates the provision of a method of enhancing the security of a chip card that contains an integrated circuit including a changeable memory and a write once/read only memory. The method of the invention, in this broad sense, comprises the steps of writing first identifying data in the write once/read only memory; establishing, on an external surface of the card, an optically readable portion comprising a machine readable optically variable device (OVD) such as a holographically generated OVD (herein termed a hologram) or a pixelgram or diffraction grating, whether or not holographically generated, having coded thereon second identifying data; and also establishing, on an external surface of the card, a magnetic stripe having coded therein third identifying data, the first, second and third identifying data being combinable to verify the authenticity of the card.

In particular, the OVD may be an optically variable light diffracting device; it is currently preferred to employ a hologram as the optically variable light diffracting device. Also, in currently preferred embodiments, the step of establishing the optically readable portion comprises superimposing the optically readable portion on the magnetic stripe. The writing step may comprise encrypting the first identifying data in the write once/read only memory.

The invention in a broad sense is not limited to any particular procedure or protocol for combining the first, second and third identifying data. For example, the second and third (optically and magnetically coded) identifying data may be combined by a predetermined manipulation or sequence of manipulations to generate or derive fourth identifying data which (if the card is authentic) are identical to the first (chip memory) identifying data; the combination of the first, second and third identifying data in such case includes the steps of manipulating the second and third identifying data to obtain the fourth identifying data and comparing the fourth identifying data with the first identifying data. Thus, as used herein, the term "combining" identifying data includes comparing identifying data to determine whether they are identical. In this exemplary sequence of operations, access to the changeable memory of the card would be granted only if the first and fourth identifying data match.

In a second aspect, the invention contemplates the provision of a chip card comprising a card body; an integrated circuit mounted within the card body and including a changeable memory and a write once/read only memory having first identifying data written therein; an optically readable portion comprising a machine readable OVD as described above (e.g., a hologram) on an external surface of the card, having coded thereon second identifying data; and a magnetic stripe on an external surface of the card having coded therein third identifying data; the first, second and third identifying data being combinable to verify the authenticity of the card.

It is also contemplated that in some instances an optically readable portion comprising a machine readable OVD (e.g., a hologram) containing second identifying data may be provided on a chip card having first identifying data written in a read-only memory, i.e., without inclusion of a magnetic stripe.

The method and article (card) of the invention afford important advantages, with respect to chip card security, in that a counterfeiter must master at least two different technologies—the computer technology employed in establishing identifying data in a read-only memory portion of the chip, and the optical technology involved in establishing identifying data in an optically readable portion (machine readable OVD) of the chip—in order to defeat the security of the card.

Further features and advantages of the invention will be apparent from the detailed description hereinbelow set forth, together with the accompanying drawings.

DETAILED DESCRIPTION

Figure 1:
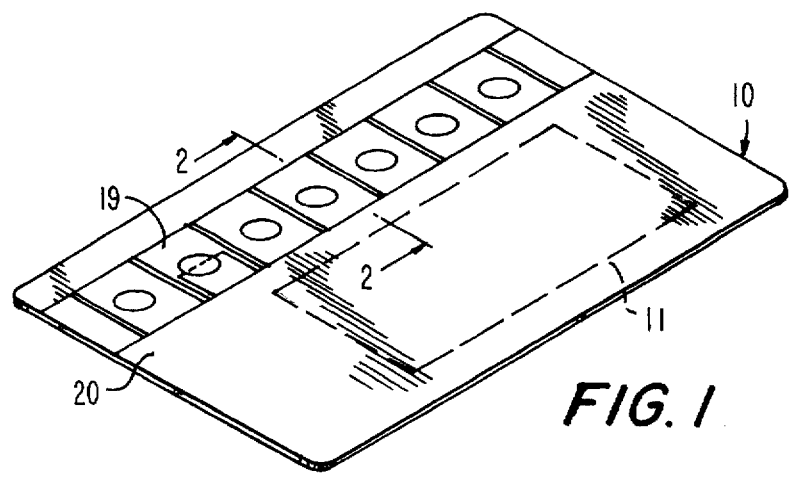
FIG. 1 is a simplified perspective view of a chip card embodying the present invention in a particular form.
Figure 2:
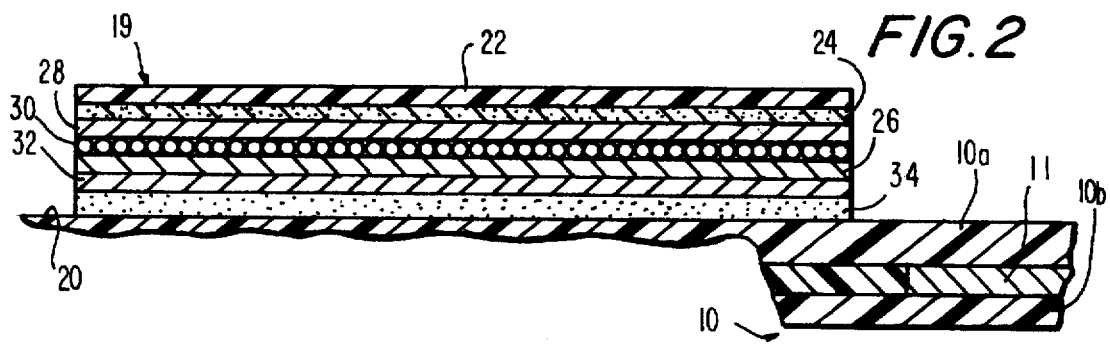
FIG. 2 is an enlarged fragmentary sectional view, not to scale, taken along the line 2—2 of FIG. 1.

FIG. 1 and 2 show a chip card 10, viz. a plastic (e.g. polyvinyl chloride) card typically having a thickness of about 30 mils and substantially the same length and width dimensions as an ordinary present-day credit card, containing externally connectable electrical circuitry in the form of an integrated circuit or chip 11 mounted within the card, for example being secured between layers 10a and 10b of the plastic constituting the card, although the chip may be at least partially exposed at a surface of the card. An example of such a card is a stored-value card, in which the amount of money stored may be decremented at off-line terminals.

Figure 3:
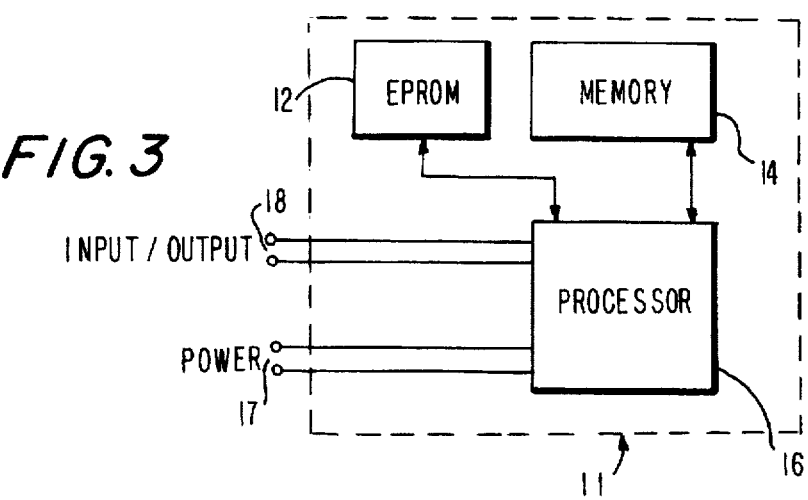
FIG. 3 is a highly simplified diagrammatic view of the circuitry mounted within the card of FIG. 1.

The chip may, for example, be an integrated circuit of the type disclosed in the aforementioned U.S. Pat. No. 4,105,156. As shown in highly simplified diagrammatic representation in FIG. 3, this chip includes a write once/read only memory (e.g. EPROM) 12, a changeable memory 14, and a processor 16 operatively connected to memories 12 and 14. The processor is connectable to an external power supply (not shown) through connector 17, and input/output connector 18 is also provided for two-way data communication between the chip and a computer terminal (not shown) external to the card. These connectors commonly constitute or are contained in a portion of the chip exposed at the card surface, although types of connectors not requiring such exposure are also known and may be used.

First identifying data are permanently written into the read-only memory 12 for use, as hereinafter explained, in a procedure for verifying the authenticity of the card. Such data may or may not be encrypted. The design and operation of the chip 11 are such as to permit access to the changeable memory 14, and performance of transactions using the card, only after verification has occurred.

As a particular feature of the present invention, in the illustrated embodiment thereof, the plastic substrate of chip card 10 bears a combined machine readable OVD/magnetic stripe, herein exemplified by a holographic/magnetic stripe 19, mounted on an external surface 20 thereof so as to be both optically and magnetically readable by a reading device external to the card. The holographic/magnetic stripe 19 may be of the type described in the aforementioned U.S. Pat. No. 5,336,871. This stripe 19 is advantageously a laminated composition formed as described in the aforementioned U.S. Pat. No. 4,684,795.

Specifically, in this embodiment, a clear plastic carrier 22, for example a ½ to one mil thick clear polyester sheet, is coated with a release coating of a commercially available clear wax slipping compound 24. The slipping compound releasably secures a hologram 26 to the carrier 22 and, upon application of heat, releases the carrier from the hologram 26. Interposed between the hologram 26 and the slipping compound 24 is one or more coats of clear scuff 28 and, optionally, a coating of glass beads 30. The coat(s) of scuff 28 are relatively hard and are conventionally used to protect magnetic tape after fixation to a substrate. The coat of glass beads 30, a composition of clear lacquer incorporating beads typically less than 5 μm in diameter, acts such that when hit by light of certain radiation, the resultant radiation can be read and measured as a further test of the validity of the document. The hologram 26 is treated, for example with methyl ethyl ketone, to facilitate adhesion of ferrous oxide 32. A high density slurry of the ferrous oxide 32 is applied to the hologram 26 by a gravure coater. The ferrous oxide 32 is generally combined with an adhesive 34 which fixes the particles of ferrous oxide 32 when dry, and upon later application of heat provides the "glue" by which the holographic/magnetic stripe 19 permanently adheres to the substrate (card) 10. The holographic/magnetic stripe 19 is fixed to the card by a hot stamping process which (1) activates the adhesive 34 and (2) allows the carrier 22 to be released from the hologram 26 via the slipping compound 24. The carrier 22, having performed its function of providing a base upon which to build the holographic/magnetic stripe, may be removed and discarded.

It will be understood that, in this described embodiment, the ferrous oxide 32 constitutes a magnetic stripe and the hologram 26 constitutes an optically readable portion. The ferrous oxide 32 stores encoded magnetic data and the hologram 26 stores encoded optical data. That is to say, as further disclosed in the aforementioned U.S. Pat. No. 5,336,871, identifying data are carried by the holographic/magnetic stripe and are divided into two sets of data (second and third identifying data) respectively encoded in holographic form on the hologram 26, and encoded magnetically on the magnetic stripe constituted of the ferrous oxide 32. These second and third identifying data are combinable, e.g. by a swipe reader (as described below) to derive or generate fourth identifying data for comparison with the first identifying data encoded in the write once/read only memory of the chip 11 to verify the authenticity of the card, e.g. at an off-line ATM or register at which the card is presented for the purpose of obtaining cash or merchandise.

The hologram 26 may configured in any suitable (e.g. known) machine-readable arrangement for relinquishing the optical information, such as the arrangements specifically described in the aforementioned U.S. Pat. No. 5,336,871. Preferably in at least some instances, the optical data may be encoded on the hologram in the manner disclosed in the aforementioned U.S. Pat. No. 5,432,329, i.e., as a machine-readable holographic code of the type described in that patent, for example, a bar code, image plane holographic pattern, or out of focus holographic pattern, in combination with an optical clock. By way of illustration, in an advantageous specific embodiment the hologram may have a holographically generated off-axis bar code invisible to the naked eye and readable by a machine reader that will not read an attempted simulation of a bar code in any other form.

While, as stated, the magnetic and optical data are very preferably encoded in a stripe 19 comprising a hologram superimposed on a magnetic stripe, the hologram and magnetic stripe may be applied to separate surface portions of the card, as also explained in the aforementioned U.S. Pat. No. 5,336,871. There is, however, an added security advantage in using a superimposed holographic/magnetic stripe, manufactured in such a way as to preclude the criminal from using a regular magnetic tape and then hot-stamping a holographic foil upon it.

Figure 4:
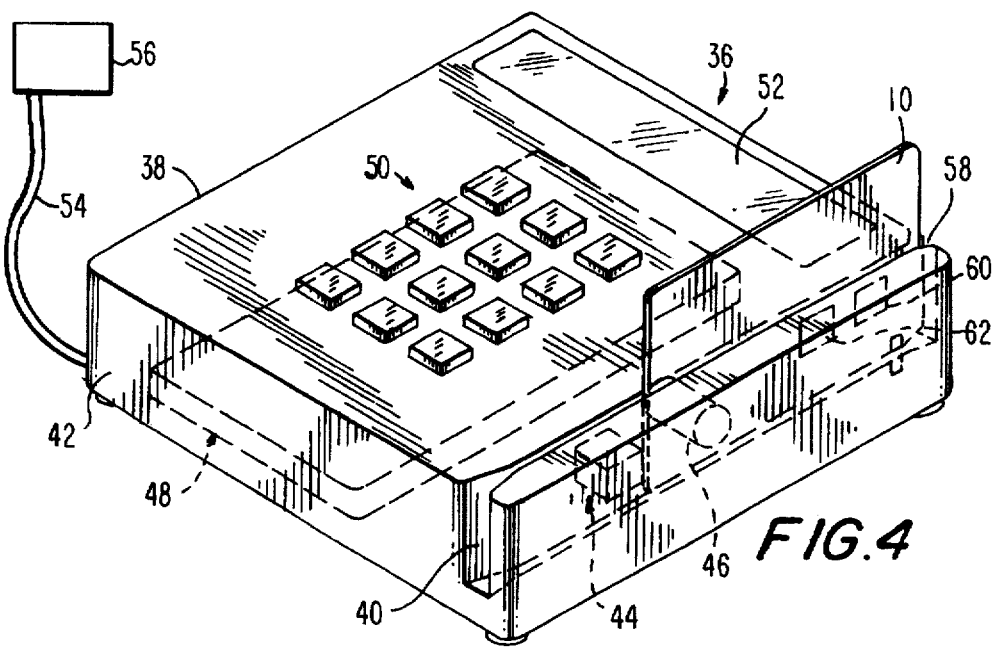
FIG. 4 is a perspective view of a device for reading the magnetic and optical security portions of the card of FIG. 1.

An illustrative swipe reader 36 for use with the card 10 is shown, in somewhat simplified form, in FIG. 4. This swipe reader is generally of the type described in the aforementioned U.S. Pat. No. 5,336,871, and includes a case 38 which defines an integral document slot 40 which extends along the right hand side of the cover 42. The cover 42 defines the side walls as well as the bottom wall of the slot 40. A magnetic read head 44 is mounted in an aperture in one of the side walls for detecting magnetic data encoded on a document's holographic/magnetic stripe 19 as the document is swiped past the magnetic read head 44. An optical data reader 46 is mounted in another aperture in one of the side walls for detecting optical data encoded on a document's holographic/magnetic stripe 19 as the document is swiped past the optical data reader 46. The electronic outputs of the magnetic read head 44 and the optical data reader 46 are sent to circuitry 48 for processing as described in greater detail with reference to FIG. 5. The swipe reader 36 also includes a keypad 50 for manual data input, a display 52 for presenting data, and a data link 54 for connecting the swipe reader to a local terminal computer 56.

Unlike the swipe reader described in U.S. Pat. No. 5,336,871, the downstream end 58 of the document slot 40 may be closed, to serve as a stop for positioning the card after it passes the magnetic and optical reading elements, and connectors indicated diagrammatically at 60 and 62 may be mounted in a side wall of the slot to interact with the power supply connector 17 and input/output connector 18 of the chip 11 when the card is so positioned, thereby to energize the chip and to provide data exchange through link 54 between the chip and the local terminal computer. It will be appreciated that the apparatus of FIG. 4 is merely exemplary of terminals with which the card 10 may be used.

The operation of the card, and the function of the security elements thereof, may now be readily explained. Stated broadly, the hologram and the magnetic stripe each contains a separate data set (second and third identifying data, respectively). Each data set or identifying data may constitute a digit or a sequence or string of digits, as may the first identifying data encoded in the write once/read only memory of the chip. The two sets respectively encoded on the hologram and the magnetic stripe are combinable to create an algorithm; thus, the process of reading the holographic/magnetic stripe is bifurcated, with the hologram and magnetic stripe each contributing a portion of the algorithm, which is then communicated to the chip and compared with the algorithm already stored in the write once/read only memory of the chip 10. The chip is programmed not to permit a transaction to proceed, or to allow access to its rewritable memory, unless this key (the algorithm obtained by reading and combining the data sets coded in the hologram and the magnetic stripe) is presented.

When the card is swiped, a reader that reads both the magnetic code and the optical code puts together the algorithm, which must match the algorithm on the chip in order to initiate the instructions to the chip card. If the reader does not read an optical signal and the magnetic number and compute the algorithm which is also written permanently to the chip card, the transaction is not allowed.

In this way, the present invention provides security of access to the value or other information inside the chip. In the described method and device, the holographic/magnetic stripe is coded with what may be characterized as an asymmetric identification number, composed of two separate codes which are uniquely different from each other, respectively carried by the holographic and magnetic portions of the stripe. The resultant combined code, or some portion of it, is written to the write once/read only memory of the chip.

The hologram, in this combination, typically contains a relatively small, simple part of the code—e.g., three digits. In the production of the hologram, by casting with a mold, several hundred different such three-digit numbers are repetitively formed. Thus, many cards will have the same holographic number. The second portion of the card number is permanently coded on the magnetic stripe, such that when the hologram and magnetic stripe are put together, their combined numbers constitute or provide a unique identification number. This number may be encrypted so as to be determined only by manipulating the combination of the holographically and magnetically encoded numbers. Also, the data set written on the write once/read only memory of the chip may or may not be encrypted.

Illustratively, in an embodiment of the present invention, a unique random number written to a write once/read only memory in the chip as described in the aforementioned U.S. Pat. No. 4,105,156 at the point of manufacture serves as one tumbler in the "lock" provided by the security system of the invention. The combined holographically and magnetically coded numbers are used as another tumbler. The encrypted multiplication or assembly of the two is used as the final tumbler which, when written and compared, will ensure that the proper chip is on the proper card and authenticate the transaction.

In the aforementioned U.S. Pat. No. 4,105,156, a protective code in the form of a random number is entered during manufacture of the card into a first memory which is chargeable only once and is available only within the card. As employed in embodiments of the present invention, the algorithm is read from the holographic/magnetic stripe and entered into the card wherein it is compared internally with the stored protective code for identity; and responsive to a positive result of such comparison, a release signal is produced by the processing unit of the card for further processing of the card.

By way of specific illustration, in the security system of the invention as in that of the aforementioned U.S. Pat. No. 5,336,871, a check digit, of which there are a number of versions, commonly called Modulus (or MOD) 9, 10, 11 or 12, may be used. All check digit schemes are based upon the manipulation of a base number multiplying, dividing, adding them together so that by the addition of a single number at the end of the base string of numbers, the correctness or authenticity of the base number is verified. Thus a serial number as in 12345 would have added to itself a check digit number which would be from 0 to 9 depending upon the modulus calculation, i.e. 123453. If there were a juxtaposition or transposing error in the number 123453, i.e., 132453 the check digit number would no longer be the numeral 3 and a flag or error would be noticed.

As an example of such operation, the third identifying data, encoded magnetically on the holographic/magnetic stripe 19, may be the string of numbers 123458. The second identifying data, encoded in the hologram (optically readable portion) of the stripe 19, may be the single number 4. The swipe reader combines these two data sets to produce a string of digits 4123458. In this string of digits, "8" is the correct check digit for 412345. Intelligent circuitry 48 in the swipe reader, presented with the combined string 4123458, will recognize that 8 is the correct check digit in this case and will allow the security operation to proceed to the next stage. If, however, the number encoded on the holographic portion of stripe 19 were a number other than 4, or were missing, the swipe reader circuitry 48 would deny further access.

The first identifying data, encoded on the write once/read only chip memory, may be 123458. If the swipe reader verifies the combined optical and magnetic readings from the stripe, it is programmed to transmit the number string 123458 to the chip as the fourth identifying data. The chip internally compares this number string with that encoded in its write once/read only memory and, finding the first and fourth identifying data to be identical, allows the transaction to proceed. If, however, some other number string were transmitted by the swipe reader to the chip, the chip processor would find lack of identity between the first and fourth identifying data and would deny further access. The swipe reader and/or the chip could further be programmed, after a limited number of retries of either verifying step, to cause the terminal to send an electrical pulse that would disable the card, e.g. by acting on one or more disabling devices such as fuses (not shown) incorporated in known manner in the chip circuitry.

Figure 5:
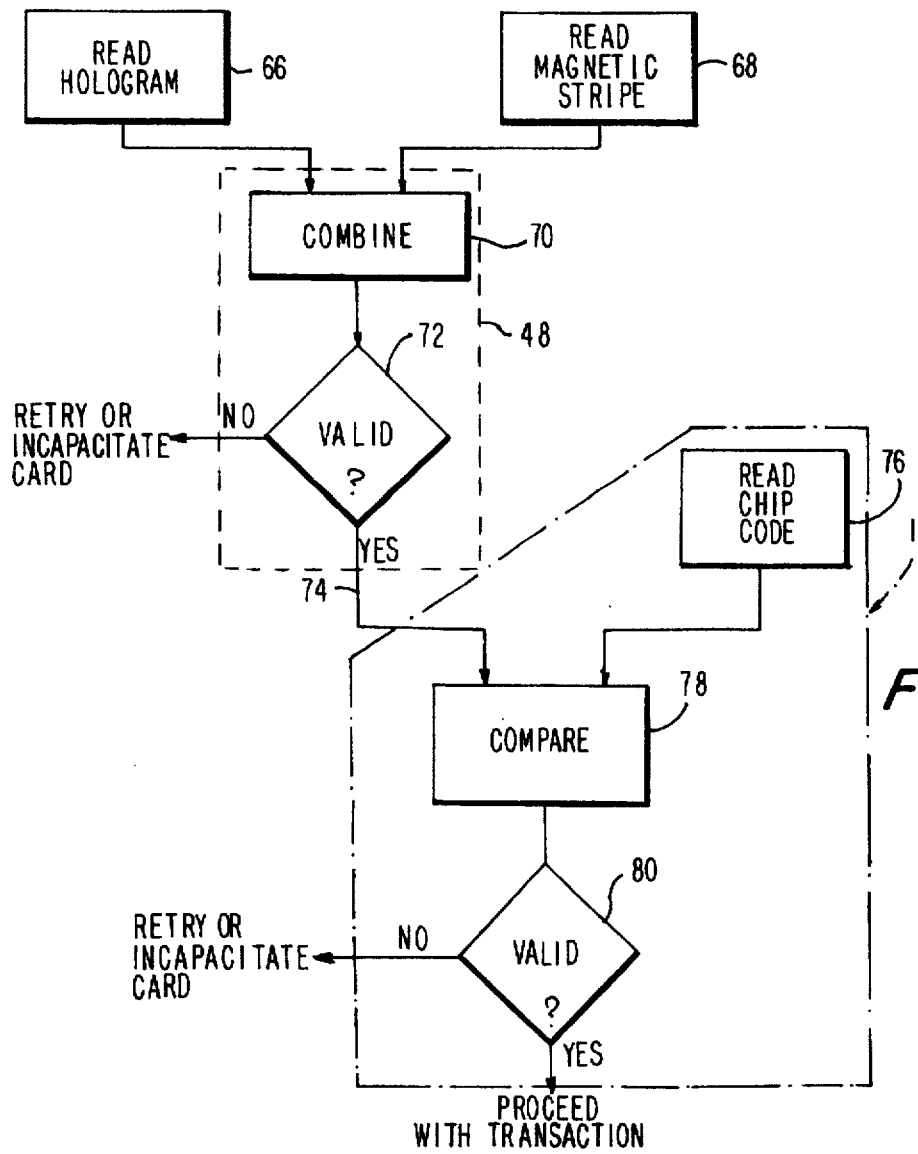
FIG. 5 is a block diagram of a method of authenticating the chip card of FIG. 1.

This operation is illustrated diagrammatically in FIG. 5. When a cardholder presents the card 10 to an off-line ATM incorporating a swipe reader as shown in FIG. 4 for the purpose of making a cash withdrawal, and swipes the card along the slot, the swipe reader circuitry 48 reads the hologram of the stripe 19 as indicated at 66, reads the magnetic portion of the stripe as indicated at 68, combines them as indicated at 70, and as indicated at 72, determines whether the card as thus far examined is valid (i.e., in the above example, whether the check digit 8 is correct for the combined number string 412345 derived from the separately encoded second and third identifying data). If the reader finds the data invalid, it retries or incapacitates the card. If the reader finds the data valid, as indicated at 74, it transmits a portion of the string (123458) as fourth identifying data to the chip 11 for further verification.

The processor of the chip then reads the first identifying data encoded on the write once/read only memory of the chip as indicated at 76, compares that number string with the transmitted fourth identifying data from the swipe reader as indicated at 78, and determines whether the two are identical as indicated at 80. If the chip processor finds nonidentity, it retries or incapacitates the card; if it determines that the compared number strings are identical, it permits the transaction to proceed. The cardholder may key into the swipe reader the amount of cash desired, and if the card bears at least this amount, as determined from the changeable memory of the chip, the ATM delivers that sum in cash and debits the changeable memory of the chip by the same amount, also recording the transaction thereon.

In one modification of the method and article of the invention, the magnetic stripe is omitted, and the externally readable hologram 26 is used alone, i.e., mounted on the exterior of the card. The hologram and the chip memory 12 in such case separately contain data sets that may be combined (for example, in the same manner as the respective data sets of the hologram and the magnetic stripe in the procedure of the aforementioned U.S. Pat. No. 5,336,871) by the chip to verify authenticity and permit or prevent a desired transaction using the card.

If the magnetic stripe is omitted, and only a hologram is used, bearing a machine readable holographic number, the optical number hidden in the hologram is read and the result written to the chip. Thereafter, when the chip card is used the reader must see and compare the optical number with the number on the chip in order to initiate a transaction.

An advantage of the invention, in all of the above-described embodiments, is that it requires knowledge of two very different technologies—that of computers, and optics—for successful counterfeiting. Unless a correctly coded hologram (or other machine readable OVD) is matched with a correctly written chip read-only memory in the same card, use of the card will be blocked.

It is to be understood that the invention is not limited to the features and embodiments herein specifically set forth, but may be carried out in other ways without departure from its spirit.

I claim:

1. A method of enhancing the security of a chip card that contains an integrated circuit including a changeable memory and a write once/read only memory, said method comprising (a) writing first identifying data in said write once/read only memory;

(b) establishing, on an external surface of the card, an optically readable portion comprising a machine readable optically variable device having coded thereon second identifying data; and (c) establishing, on an external surface of the card, a magnetic stripe having coded therein third identifying data;

said first, second and third identifying data being combinable to verify the authenticity of the card to the integrated circuit.

2. A method according to claim 1 wherein said writing step comprises encrypting said first identifying data in said write once/read only memory.

3. A method according to claim 1 wherein said first identifying data are identical to fourth identifying data derivable by combining said second and third identifying data.

4. A method according to claim 3 wherein said writing step comprises encrypting said first identifying data in said write once/read only memory.

5. A method according to claim 1 wherein the step of establishing the optically readable portion comprises superimposing the optically readable portion on the magnetic stripe.

6. A method according to claim 1 wherein said optically variable device is a hologram.

7. A method of enhancing the security of a chip card that contains an integrated circuit including a changeable memory and a write once/read only memory, said method comprising (a) writing first identifying data in said write once/read only memory and (b) establishing, on an external surface of the card, an optically readable portion comprising a machine readable optically variable device having coded thereon second identifying data combinable with said first identifying data to verify the authenticity of the card to the integrated circuit.

8. A method according to claim 7 wherein said optically variable device is a hologram.

9. A chip card comprising:
 (a) a card body;
 (b) an integrated circuit mounted within the card body and including a changeable memory and a write once-read only memory having first identifying data written therein;
 (c) an optically readable portion comprising a machine readable optically variable device on an external surface of the card, having coded thereon second identifying data; and
 (d) a magnetic stripe on an external surface of the card having coded therein third identifying data;
said first, second and third identifying data being combinable to verify the authenticity of the card to the integrated circuit.

10. A card as defined in claim 9 wherein the optically readable portion is superimposed on the magnetic stripe.

11. A card as defined in claim 9 wherein said optically variable device is a hologram.

12. A chip card comprising:
 (a) a card body;
 (b) an integrated circuit mounted within the card body and including a changeable memory and a write once/read only memory having first identifying data written therein; and
 (c) an optically readable portion comprising a machine readable optically variable device on an external surface of the card, having coded thereon second identifying data combinable with said first identifying data by a procedure to verify the authenticity of the card to the integrated circuit.

13. A card as defined in claim 12 wherein said optically variable device is a hologram.

* * * * *